(12) United States Patent
Iida

(10) Patent No.: US 9,311,036 B2
(45) Date of Patent: Apr. 12, 2016

(54) DATA PROCESSING SYSTEM AND METHOD OF DATA PROCESSING

(71) Applicant: Hirokazu Iida, Tokyo (JP)

(72) Inventor: Hirokazu Iida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/287,425

(22) Filed: May 27, 2014

(65) Prior Publication Data

US 2014/0347692 A1    Nov. 27, 2014

(30) Foreign Application Priority Data

May 27, 2013   (JP) .................................. 2013-111181
Apr. 30, 2014  (JP) .................................. 2014-093868

(51) Int. Cl.
  *G06F 3/12*    (2006.01)
  *H04N 1/21*    (2006.01)

(52) U.S. Cl.
  CPC ............ *G06F 3/1273* (2013.01); *G06F 3/1203* (2013.01); *G06F 3/1245* (2013.01); *H04N 1/21* (2013.01); *G06F 3/1259* (2013.01)

(58) Field of Classification Search
  None
  See application file for complete search history.

(56) References Cited

U.S. PATENT DOCUMENTS

| | | | |
|---|---|---|---|
| 2009/0015864 A1* | 1/2009 | Hasegawa ..................... | 358/1.15 |
| 2010/0309500 A1 | 12/2010 | Suzuki | |
| 2011/0075166 A1* | 3/2011 | Goldwater et al. ............ | 358/1.9 |
| 2012/0210323 A1* | 8/2012 | Hosouchi et al. ............. | 718/102 |
| 2013/0070280 A1* | 3/2013 | Hosoda ........................ | 358/1.14 |
| 2013/0169989 A1* | 7/2013 | Oki .............................. | 358/1.14 |

FOREIGN PATENT DOCUMENTS

JP    2010-286873    12/2010

* cited by examiner

*Primary Examiner* — John Wallace
(74) *Attorney, Agent, or Firm* — Harness, Dickey & Pierce, P.L.C.

(57) ABSTRACT

A data processing system includes a first processor and a second processor and further includes an intermediate data generating unit that generates intermediate data; a first storage control unit that stores the intermediate data and identification data that identifies the intermediate data in correspondence with each other in a first storage area; a second storage control unit that stores the identification data in correspondence with the intermediate data in a second storage area; a process requesting unit that sends a request for processing the print data to an image processing apparatus; and an obtaining unit that obtains a processed result from the image processing apparatus based on the identification data.

8 Claims, 12 Drawing Sheets

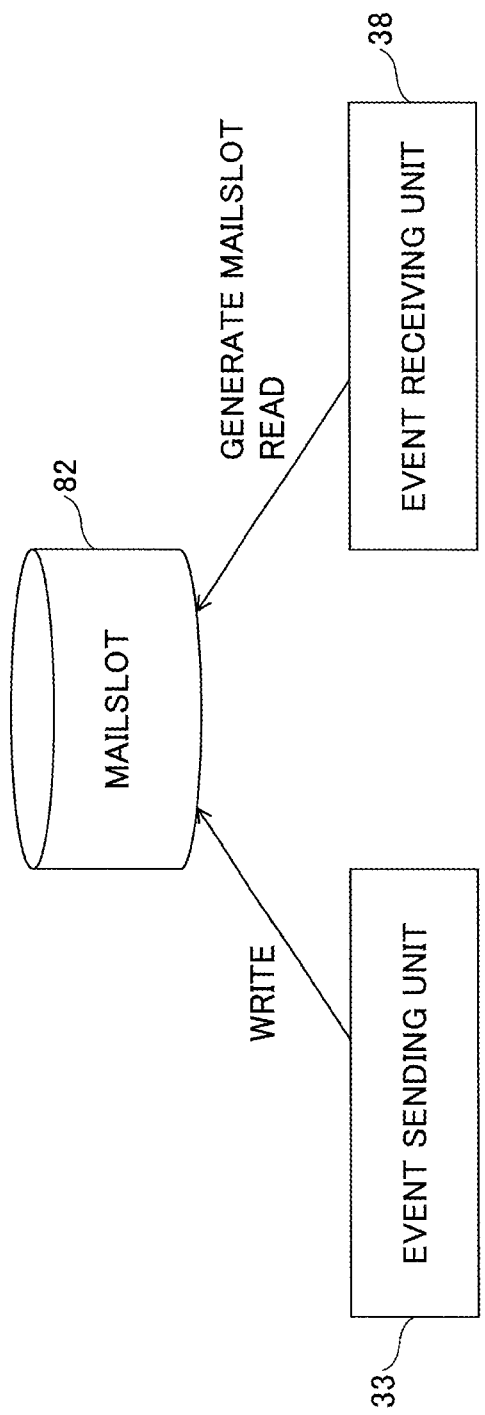

DATA PROCESSING SYSTEM AND METHOD OF DATA PROCESSING

BACKGROUND OF THE INVENTION

1. Field of the Invention

The present invention relates to a data processing system and a method of data processing.

2. Description of the Related Art

A print solution is known in which a print instruction is sent from a print application program to a printer driver to output data, and the output data is sent to a printer after displaying a preview image of the data, processing the data or the like, for example. Such a print solution is used as well in a point and print environment in which the printer driver is downloaded from a server to a client in order for the client to use the printer driver on the server to output data, for example.

Further, a method of printing is known in which a first printer driver having a first function generates intermediate data and a second printer driver having a second function sends the intermediate data to a printer to be printed for dynamically selecting a printer that prints print data based on a document file (see Patent Document 1, for example).

However, in the conventional method as disclosed in Patent Document 1, there was no scheme for tracking whether the intermediate data formed in a generic data format is actually printed or the like, and it was impossible to provide a further solution.

PATENT DOCUMENT

[Patent Document 1] Japanese Laid-open Patent Publication No. 2010-286873

SUMMARY OF THE INVENTION

The present invention is made in light of the above problems, and provides a technique capable of tracking intermediate data generated in a predetermined data format.

According to an embodiment, there is provided a data processing system including a first processor and a second processor, further including: a print request accepting unit that accepts a request for printing; an intermediate data generating unit that generates intermediate data based on the request for printing accepted by the print request accepting unit; a first storage control unit that stores the intermediate data generated by the intermediate data generating unit and identification data that identifies the intermediate data in correspondence with each other in a first storage area; a notification unit that sends a notification including a fact that the intermediate data is generated by the intermediate data generating unit; a processing unit that performs a process regarding the intermediate data stored in the first storage area upon receiving the notification from the notification unit; a second storage control unit that stores the identification data that is stored in the first storage area in correspondence with the intermediate data processed by the processing unit in a second storage area, which is different from the first storage area; a conversion unit that converts the intermediate data processed by the processing unit to print data that is processable by an image processing apparatus; a process requesting unit that sends a request for processing the print data converted by the conversion unit to the image processing apparatus; a result request accepting unit that accepts a request for obtaining a processed result of the request for printing; and an obtaining unit that obtains the processed result from the image processing apparatus based on the identification data stored in the second storage area when the result request accepting unit accepts the request for obtaining the processed result, wherein functions of the print request accepting unit and the result request accepting unit are performed by the first processor, functions of the intermediate data generating unit, the first storage control unit and the notification unit are performed by the first processor or the second processor, and functions of the processing unit, the second storage control unit, the conversion unit and the obtaining unit are performed by the second processor.

According to another embodiment, there is provided a method of data processing using a first processor and a second processor, including: accepting a request for printing; generating intermediate data based on the request for printing accepted in the accepting; storing the intermediate data generated in the generating and identification data that identifies the intermediate data in correspondence with each other in a first storage area; sending a notification including a fact that the intermediate data is generated; performing a process regarding the intermediate data stored in the first storage area upon receiving the notification; storing the identification data that is stored in the first storage area in correspondence with the intermediate data processed in the processing in a second storage area, which is different from the first storage area; converting the intermediate data processed in the processing to print data that is processable by an image processing apparatus; sending a request for processing the print data converted in the converting to the image processing apparatus; accepting a request for obtaining a processed result of the request for printing; and obtaining a processed result from the image processing apparatus based on the identification data stored in the second storage area when the request for obtaining the processed result is accepted, wherein the accepting the request for printing and the accepting the request for obtaining the processed result are performed by the first processor, the storing the intermediate data, the generating the intermediate data and the sending the notification are performed by the first processor or the second processor, and the performing the process, the storing the identification data, the converting the intermediate data, the requesting processing of the print data and the obtaining the processed result are performed by the second processor.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 8 is a view illustrating sending and receiving an event notification of the embodiment;

DETAILED DESCRIPTION OF THE PREFERRED EMBODIMENTS

Figure 1:
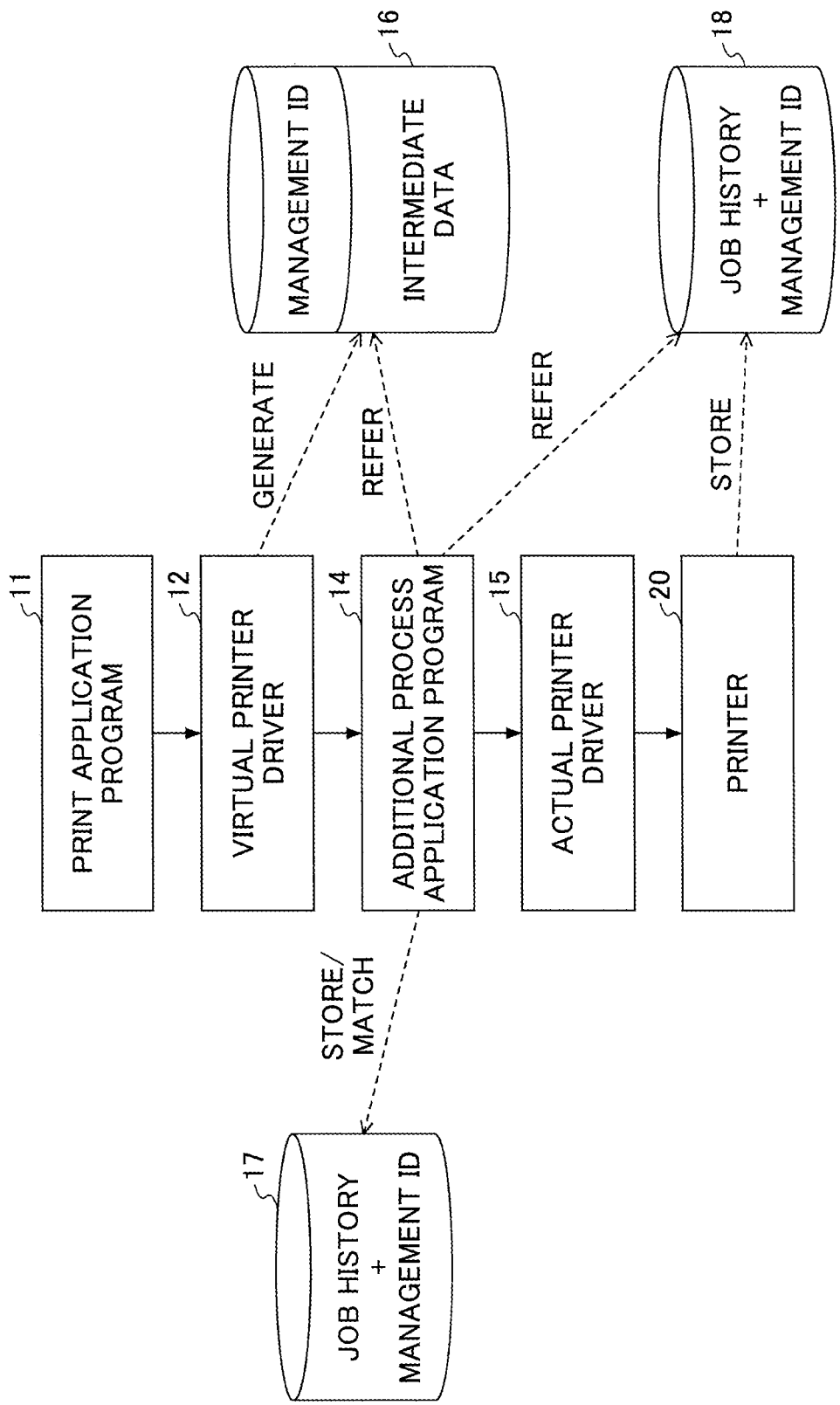
FIG. 1 is a schematic view illustrating a print solution of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Schematic Structure of Print Solution)

A print solution is explained as an example of one of various solutions using intermediate data provided by a data processing apparatus or the like of the embodiment. FIG. 1 is a schematic structure of a print solution of the embodiment.

As illustrated in FIG. 1, in the print solution of the embodiment, a print application program 11 such as document editing software, spreadsheet software or the like, for example, obtains an object to be printed such as a document, an image or the like, respectively. Then, a virtual printer driver 12 generates intermediate data, which is in a generic data format, based on the object to be printed obtained from the print application program 11. Thereafter, the virtual printer driver 12 adds management ID (IDentification) to the intermediate data. The management ID is an example of management data for managing the intermediate data (identification data that identifies the intermediate data). The intermediate data and the management ID are stored in a first storage 16 (an example of a first storage area) in correspondence with each other.

Then, in the print solution of the embodiment, an additional process application program 14 performs an additional function on the intermediate data generated by the virtual printer driver 12. The additional process application program 14 is a software module for providing a function additionally defined in printing within a scheme of a printer driver, for example.

The additional process application program 14 displays a preview image based on the intermediate data or edits the intermediate data as the additional function, for example, but the additional function is not limited so.

The additional process application program 14 refers to the management ID added to the intermediate data by the virtual printer driver 12, sends the intermediate data with the management ID to an actual printer driver 15, and stores the management ID as job history of the intermediate data in a second storage 17 (an example of a second storage area).

Then, in the print solution of the embodiment, the actual printer driver 15 generates print data in a Page Description Language (PDL) in accordance with a printer based on the intermediate data obtained from the additional process application program 14. The actual printer driver 15 adds the management ID obtained from the additional process application program 14 to the generated print data and sends it to a printer.

Then, in the print solution of the embodiment, a printer 20 prints the print data sent from the actual printer driver 15. The printer 20 stores a result of printing indicating whether the print data is successfully printed with the management ID obtained from the actual printer driver 15 as job history of the print data in a storage 18.

With this, the additional process application program 14 is capable of obtaining a result of printing indicating whether the intermediate data is successfully printed by the printer 20 by matching the job history of the intermediate data stored in the second storage 17 and the job history of the print data stored in the storage 18 based on the management ID.

As described above, according to the print solution of the embodiment, it is capable of tracking and managing intermediate data generated in a generic data format, for example. Further, the various solutions using the intermediate data of the embodiment may include another output solution using another output apparatus other than the printer in addition to the print solution.

(Client PC: Functional Structure)

Figure 2:
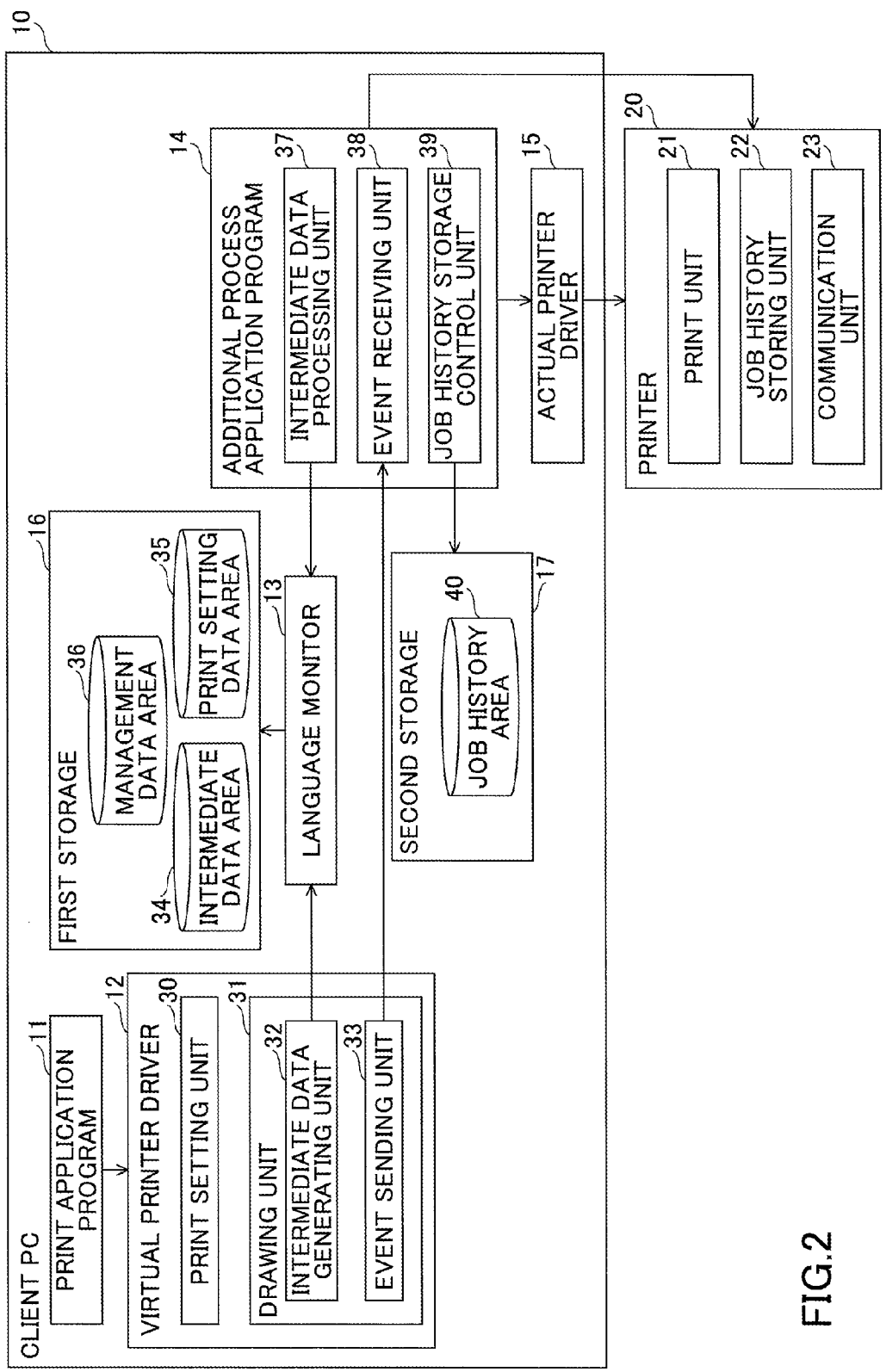
FIG. 2 is a view illustrating an example of a functional structure of a client PC of the embodiment.

Next, an example of a functional structure of a client PC (Personal Computer) that is an example of a data processing apparatus actualizing the above described print solution is explained. FIG. 2 is a view illustrating an example of a functional structure of a client PC 10 of the embodiment.

As illustrated in FIG. 2, the client PC 10 includes the print application program 11, the virtual printer driver 12, a language monitor 13, the additional process application program 14, the actual printer driver 15, the first storage 16 and the second storage 17.

The client PC 10 performs printing using the printer 20, which is an example of an image processing apparatus, for example. The printer 20 may be a printer, a facsimile machine, a scanner, a Multi Function Peripheral (MFP) capable of being used as a copying machine, or the like.

The print application program 11 may be document editing software such as Word (registered trademark) or the like, spreadsheet software such as Excel (registered trademark) or the like, for example. The print application program 11 outputs a document, an image or the like that is the object to be printed by the printer 20 as a request for printing (in other words, a print job and hereinafter referred to as a "print request") to the virtual printer driver 12.

The virtual printer driver 12 includes a print setting unit 30 and a drawing unit 31, and accepts the print request from the print application program 11. The virtual printer driver 12 is an example of a print request accepting unit and a result request accepting unit.

The print setting unit 30 provides a Graphical User Interface (GUI) or the like for accepting an input from a user, and obtains print setting data for performing printing by the printer 20 set by the user.

The drawing unit 31 includes an intermediate data generating unit 32 and an event sending unit 33. The intermediate data generating unit 32 generates intermediate data, from which print data is generated, based on the document, the image or the like that is the object to be printed as the print request from the print application program 11, for example. The intermediate data generating unit 32 generates the intermediate data in a generic format such as Paser Specification (XML), PostScript (PS), Portable Document Format (PDF) or the like.

Here, the intermediate data generating unit 32 generates the management ID, which is identification data that identifies the intermediate data, for managing the intermediate data. The intermediate data generating unit 32 generates the management ID using current time, log-in user name, job ID or the like, for example, and adds the management ID to the intermediate data. The management ID may be unique in the entirety of the print solution in which printing is performed using the printer 20. For example, when a plurality of the client PCs 10 uses a plurality of the printers 20, the management ID may be unique among the client PCs 10 and the printers 20.

When adding the management ID to the intermediate data, the intermediate data generating unit 32 may embed the management ID at a head or the like of the intermediate data having the above described data format, or may embed the management ID in the print setting data or the like described as PrintTicket or the like, for example.

The event sending unit 33 is an example of a notification unit that sends event notifications regarding an output status of the intermediate data generated by the intermediate data generating unit 32, to the additional process application program 14. The event notifications may include an event notification indicating that printing (outputting) the intermediate data by the virtual printer driver 12 is started (hereinafter, referred to as a "print start notification"), an event notification indicating that printing (outputting) the intermediate data by the virtual printer driver 12 is being processed (hereinafter, referred to as a "print process notification"), an event notification indicating that printing (outputting) the intermediate data by the virtual printer driver 12 is completed (hereinafter, referred to as a "print completion notification") or the like. The event sending unit 33 may use an interprocess communication such as a Mailslot communication or the like provided by an Operating System (OS), for example.

The language monitor 13 is a software module that is within a scheme of an OS, for example. The language monitor 13 is an interface that reads data or writes data using a specific key, a printer name or the like, and has a function to communicate using a network. The language monitor 13 reads data, writes data or the like in accordance with a call of the interface from the virtual printer driver 12 or the additional process application program 14, for example.

The language monitor 13 is an example of a first storage control unit that stores the intermediate data, the print setting data and the management ID obtained from the virtual printer driver 12 in correspondence with each other, in the first storage 16. For example, the language monitor 13 stores the intermediate data (data to be printed), the print setting data and the management ID in an intermediate data area 34, a print setting data area 35 and a management data area 36 of the first storage 16, respectively.

The additional process application program 14 is an application program that provides an additional function in printing. The additional process application program 14 includes an intermediate data processing unit 37, an event receiving unit 38 and job history storage control unit 39, for example.

The event receiving unit 38 receives the event notifications sent from the event sending unit 33 of the virtual printer driver 12. Thus, the event receiving unit 38 is capable of recognizing processes performed on the intermediate data by the intermediate data generating unit 32 of the virtual printer driver 12. Similar to the event sending unit 33, the event receiving unit 38 may use an interprocess communication such as a Mailslot communication or the like provided by an Operating System (OS), for example.

The intermediate data processing unit 37 is an example of a processing unit that performs data processing regarding the intermediate data. For example, the intermediate data processing unit 37 performs an additional process such as displaying a preview image based on the intermediate data, processing the intermediate data (changing the data for aggregate printing or the like), editing the intermediate data or the like. Further, the intermediate data processing unit 37 is an example of an obtaining unit that obtains a processed result from the printer 20 based on the management ID.

The intermediate data processing unit 37 obtains the intermediate data from the intermediate data area 34 of the first storage 16 via the language monitor 13 at timing when the event receiving unit 38 receives the print completion notification from the event sending unit 33 of the virtual printer driver 12. Then, the intermediate data processing unit 37 performs the above described additional processes.

Here, the intermediate data processing unit 37 may use a key, a printer name or the like received from the event sending unit 33 of the virtual printer driver 12 as a specific key to access the intermediate data area 34 stored in the first storage 16 via the language monitor 13.

The intermediate data processing unit 37 may process or edit the intermediate data by adding a watermark, a woven pattern or the like to the intermediate data when the intermediate data includes a specific character string such as "company secret", "confidential" or the like.

When sending the intermediate data to the actual printer driver 15, the intermediate data processing unit 37 may include the management ID in the print setting data or the like that is described by PrintTicket. Further, the intermediate data processing unit 37 may send the management ID corresponding to the intermediate data using interface (ExtEscape( ) or the like) such as Windows (registered trademark) Print API (Application Program Interface) or the like, to the actual printer driver 15.

The intermediate data processing unit 37 controls the job history storage control unit 39 to store a job name of the intermediate data with the management ID in job history area 40 of the second storage 17, which is different from the first storage 16, as job history of the intermediate data.

The job history storage control unit 39 is an example of a second storage control unit. Upon an instruction from the intermediate data processing unit 37, the job history storage control unit 39 stores the job history of the intermediate data in the job history area 40 of the second storage 17 after the intermediate data processing unit 37 sends the intermediate data to the actual printer driver 15. The job history storage control unit 39 stores a job name of the intermediate data (a name of a document to be printed or the like, for example) and the management ID of the intermediate data in correspondence with each other, in the job history area 40 of the second storage 17 as the job history.

The above described intermediate data area 34, the print setting data area 35, the management data area 36 and the job history area 40 are provided in a Hard Disk Drive (HDD), a memory or the like in the client PC 10, for example.

The actual printer driver 15 is an example of a conversion unit that converts the intermediate data sent from the intermediate data processing unit 37 into print data processable (printable) by the printer 20. Specifically, the actual printer driver 15 converts the intermediate data to print data in a PDL format that corresponds to the printer 20 such as Printer Control Language (PCL) 6, PS, Refined Printing Command Stream (PRCS) or the like.

As the intermediate data is generated in a generic data format, the actual printer driver 15 is capable of generating print data in a PDL format that corresponds to the printer 20. As such, the actual printer driver 15 has a function to convert the intermediate data to the print data (output data).

The actual printer driver 15 is also an example of a process requesting unit that sends a request for processing the print data by the printer 20. The actual printer driver 15 adds the management ID (@PJL SET JOBTRACEID=xxxxx, for example) of the intermediate data to the print data using a printer job language (PJL) or the like as a predetermined job language corresponds to the printer 20, sends the print data to the printer 20 and requests the printer 20 to process the print data.

The printer 20 includes a print unit 21, a job history storing unit 22 and a communication unit 23. The print unit 21 prints the print data sent from the actual printer driver 15 of the client PC 10. The job history storing unit 22 stores the management ID of the print data and a processed result of printing indicating whether the print data is successfully printed or not (success or error) as job history of the print data. The communication unit 23 communicates with the client PC 10.

After the print data is printed by the printer 20, upon accepting an inquiry of the job history of the print data for the printer 20 (a request for obtaining a processed result in response to the print request) from the user such as an administrator or the like based on a job name or the like, the intermediate data processing unit 37 of the additional process application program 14 obtains the respective management ID that is in correspondence with the job name from the job history area 40 of the second storage 17 based on the job name. Then, the intermediate data processing unit 37 obtains the respective job history of the print data that is in correspondence with the obtained management ID from the printer 20 based on the obtained management ID. Then, the job history of the print data is reported to the user.

As such, the intermediate data processing unit 37 is capable of managing the intermediate data such as reporting the result of printing to the user using a GUI or the like.

The above described processes of the print application program 11, the virtual printer driver 12, the language monitor 13, the additional process application program 14 and the actual printer driver 15 are performed by a Central Processing Unit (CPU, a first processor) of the client PC 10.

(Data Processing System: Functional Structure)

An example in which the print solution is actualized only by the client PC 10 is explained with reference to FIG. 2. Alternatively, the print solution may be actualized by a data processing system including a client PC and a server, for example. An example of a structure of a data processing system of the embodiment is explained.

Figure 3:
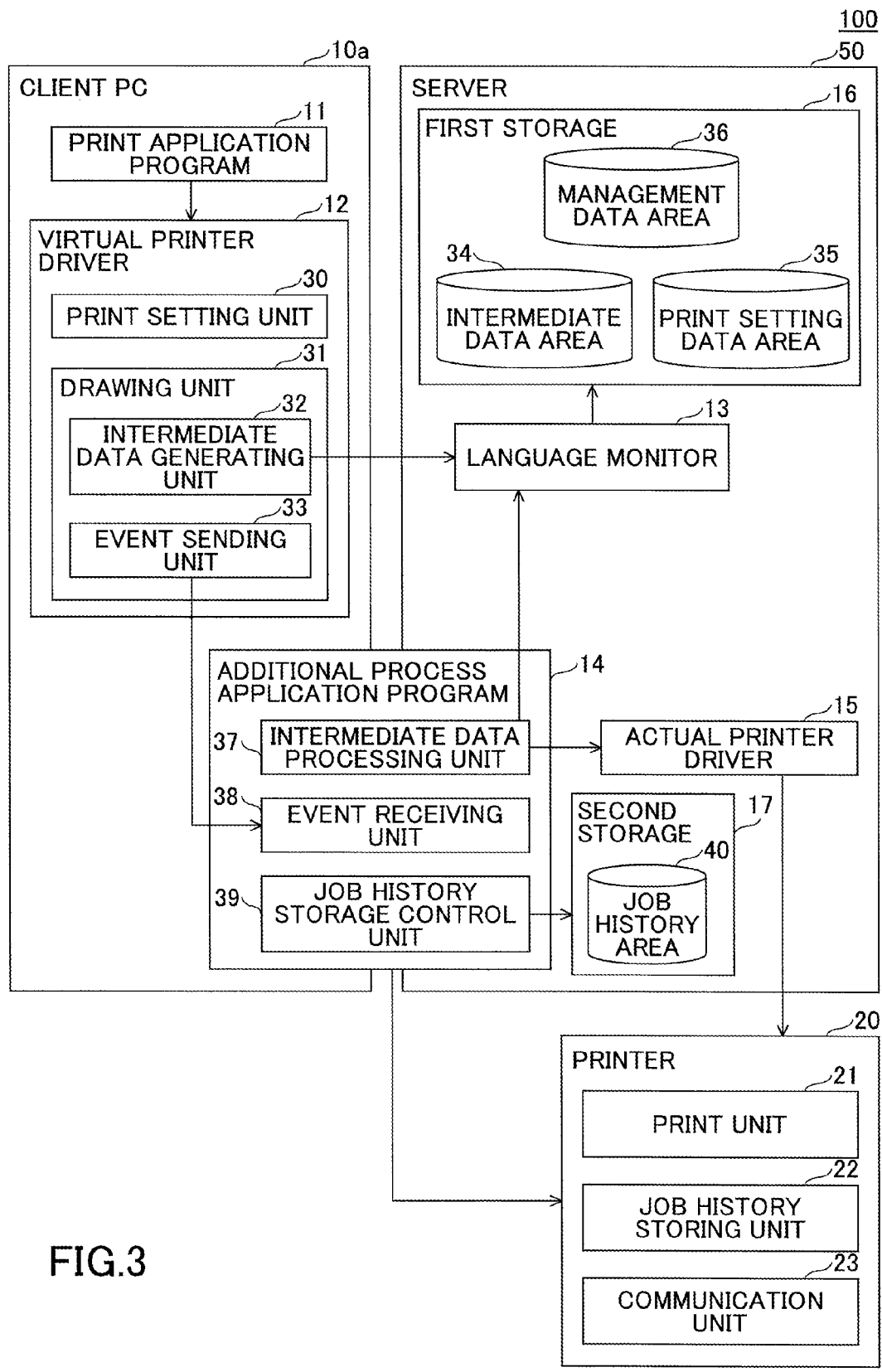
FIG. 3 is a view illustrating an example of a functional structure of a data processing system of the embodiment.

FIG. 3 is a view illustrating an example of a functional structure of a data processing system 100 of the embodiment. As illustrated in FIG. 3, the data processing system 100 of the embodiment includes a client PC 10a and a server 50. The client PC 10a and the server 50 are connected with each other via a network.

In the data processing system 100, the client PC 10a performs a part of the print solution by a point and print function in which the client PC 10a downloads a printer driver or the like installed in the server 50 from the server 50. As such, in this example, functions of the print solution are distributed in the client PC 10a and the server 50 of the data processing system 100.

For the example illustrated in FIG. 3, the client PC 10a includes the print application program 11, the virtual printer driver 12 and the additional process application program 14. The client PC 10a downloads the virtual printer driver 12 and the additional process application program 14 from the server 50, for example, and installs them to actualize the corresponding functions.

The server 50 includes the language monitor 13, the additional process application program 14 and the actual printer driver 15. The same components as illustrated in FIG. 2 are given the same reference numerals, and explanations are not repeated.

For the example illustrated in FIG. 3, in the data processing system 100, the client PC 10a includes the additional process application program 14 so that the client PC 10a can actualize a function of displaying the preview image, among the additional functions of the additional process application program 14 as described above.

Further, in the data processing system 100, the server 50 also includes the additional process application program 14 so that the server 50 can actualize a function of processing and editing the intermediate data (Server Side Rendering (SSR), for example), among the additional functions of the additional process application program 14 as described above.

The virtual printer driver 12 of the client PC 10a sends the intermediate data generated by the intermediate data generating unit 32 to the first storage 16 of the server 50 via the language monitor 13. The server 50 stores the print data, the print setting data and the management ID of the intermediate data obtained via the language monitor 13 in the intermediate data area 34, the print setting data area 35 and the management data area 36, respectively.

The event sending unit 33 of the virtual printer driver 12 of the client PC 10a sends the print start notification of the intermediate data, the print completion notification of the intermediate data or the like to the event receiving units 38 of the additional process application programs 14 of the client PC 10a and the server 50, respectively.

The intermediate data processing unit 37 of the additional process application program 14 of the client PC 10a obtains the intermediate data via the language monitor 13 of the server 50 and displays a preview image, based on the print completion notification of the intermediate data obtained by the event receiving unit 38.

Further, the intermediate data processing unit 37 of the additional process application program 14 of the server 50 obtains the intermediate data via the language monitor 13 and processes or edits the intermediate data, based on the print completion notification of the intermediate data or the like obtained by the event receiving unit 38. The job history storage control unit 39 of the additional process application program 14 of the server 50 stores the management ID or the like in the job history area 40 of the second storage 17 as the job history of the intermediate data.

The intermediate data area 34, the print setting data area 35, the management data area 36 and the job history area 40 illustrated in FIG. 3 are stored in the HDD, the memory or the like in the server 50, for example.

Here, in general, a storage to store intermediate data generated by a virtual printer driver like the virtual printer driver 12 of the client PC 10a is set in accordance with a spooling method (RAW, EMF or the like), or a common option (Client Side Rendering (CSR), SSR or the like) of a printer. In other words, the intermediate data generated by the virtual printer driver of the client PC is stored in a storage of the client PC or the server.

Thus, in such a case, for example, it is necessary for the additional process application program 14 of the client PC 10a or the server 50 to find the storage in which the intermediate data is stored in order to access the intermediate data for performing the above described process. Further, depending on the storage in which the intermediate data is stored, it is necessary for the client PC 10a and the server 50 to follow a communication protocol such as an IP address or the like.

Further, even when a common file is used, it is troublesome to manage access rights to the common file or the like.

However, according to the data processing system 100 of the embodiment, the additional process application program 14 of the client PC 10a or the server 50 obtains the intermediate data via the language monitor 13 using a previously set identifier or the like as a specific key, for example. Thus, it is unnecessary for the virtual printer driver 12 of the client PC 10a of the embodiment to report the storage in which the intermediate data is stored to the additional process application program 14 of the client PC 10a or the server 50. Thus, the process can be simplified.

Further, as the language monitor 13 is within the scheme of the OS, affinity with the OS is also high. The additional process application program 14 of the client PC 10a may be executed at predetermined timing by downloading and installing the additional process application program 14 that is a part of a virtual printer driver of the server 50 by the point and print function.

Further, when the additional process application program 14 of the client PC 10a is prepared by downloading the part of the virtual printer driver of the server 50 by the point and print function, the additional process application programs 14 of the server 50 and the client PC 10a are synchronized by the point and print function. Thus, the job history areas 40 are also synchronized at the server 50 side and the client PC 10a so that data stored in the job history areas 40 can be obtained from both the server 50 and the client PC 10a.

Further the additional process application programs 14 may be previously installed in both the client PC 10a and the server 50, respectively, and may be executed as resident application programs.

With the above structure, by adding an additional function by the additional process application program 14 using the intermediate data in the generic data format, it is possible to provide a print solution capable of printing in various PDL formats, not just in a specific PDL format.

Further, the additional process application program 14 can easily access the intermediate data by using the language monitor 13 without following the communication protocol between the client PC 10a and the server 50. Further, in the above described structure, by sharing the management ID, the intermediate data can be tracked.

The above described processes of the print application program 11, the virtual printer driver 12 and the additional process application program 14 of the client PC 10 are performed by the CPU (a first processor) of the client PC 10. The above described processes of the language monitor 13, the additional process application program 14 and the actual printer driver 15 of the server 50 are performed by a CPU (a second processor) of the server 50.

(Hardware Structure)

Figure 4:
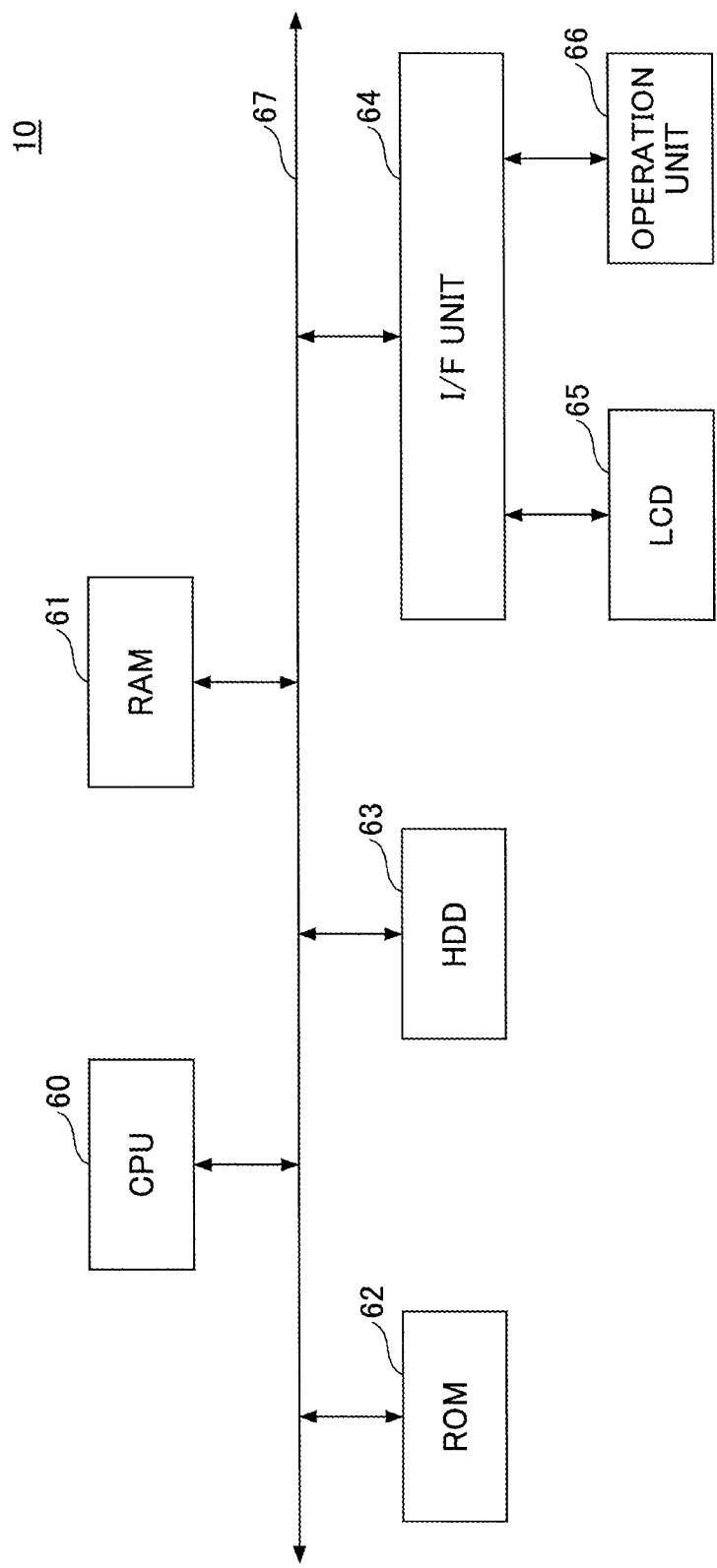
FIG. 4 is a view illustrating an example of a hardware structure of the embodiment.

An example of a hardware structure of the client PC 10 illustrated in FIG. 2 of the embodiment is explained. FIG. 4 is a block diagram illustrating an example of a hardware structure of the client PC 10. Although FIG. 4 illustrates the example of the hardware structure of the client PC 10, each of the client PC 10a and the server 50 illustrated in FIG. 3 and the printer 20 may have a hardware structure similar to that of the client PC 10 illustrated in FIG. 4.

As illustrated in FIG. 4, the client PC 10 includes a CPU 60, a Random Access Memory (RAM) 61, a Read Only Memory (ROM) 62, a HDD 63, an I/F unit 64, a Liquid Crystal Display (LCD) 65 and an operation unit 66.

The CPU 60, the RAM 61, the ROM 62, the HDD 63 and the I/F unit 64 are connected with each other via a bus 67. The LCD 65 and the operation unit 66 are connected to the I/F unit 64. For the case of the printer 20, the hardware structure further includes engines for forming and outputting an image, scanning an image or the like.

The CPU 60 is a calculation unit and controls the entirety of an operation of the client PC 10. For the case of the client PC 10 or the client PC 10a, the CPU 60 functions as a first processor to control the processes of the above described application programs, the drivers and the like. For the case of the server 50, the CPU 60 functions as a second processor to control the processes of the above described application program, the drivers and the like.

The RAM 61 is a volatile recording medium capable of having data be rapidly read and written. The RAM 61 is used as an operation area for the CPU 60 to process data.

The ROM 62 is a readable non-volatile recording medium. Programs such as firmware or the like are stored in the ROM 62. The HDD 63 is a readable and writable non-volatile recording medium. Programs such as OS, various control programs, application programs or the like are stored in HDD 63.

The I/F unit 64 is connected to various hardware, networks or the like. The LCD 65 is a user interface by which a user can confirm a status of the client PC 10. The operation unit 66 is a user interface by which the user can input information. The operation unit 66 may be a keyboard, a mouse, various hard buttons, a touch panel or the like. For the case of the server 50, the server 50 may not include the user interfaces such as the LCD 65, the operation unit 66 or the like.

The functional structure (software structure) of each of the apparatuses illustrated in FIG. 2 and FIG. 3 is actualized by the hardware structure such that a program stored in the recording medium such as the ROM 62, the HDD 63, an optical disk or the like is read out on the RAM 61 and executed by the CPU 60. The functions of each of the apparatuses are actualized by a combination of such a functional structure (software structure) and such a hardware structure.

(Additional Process Application Program 14)

Figure 5:
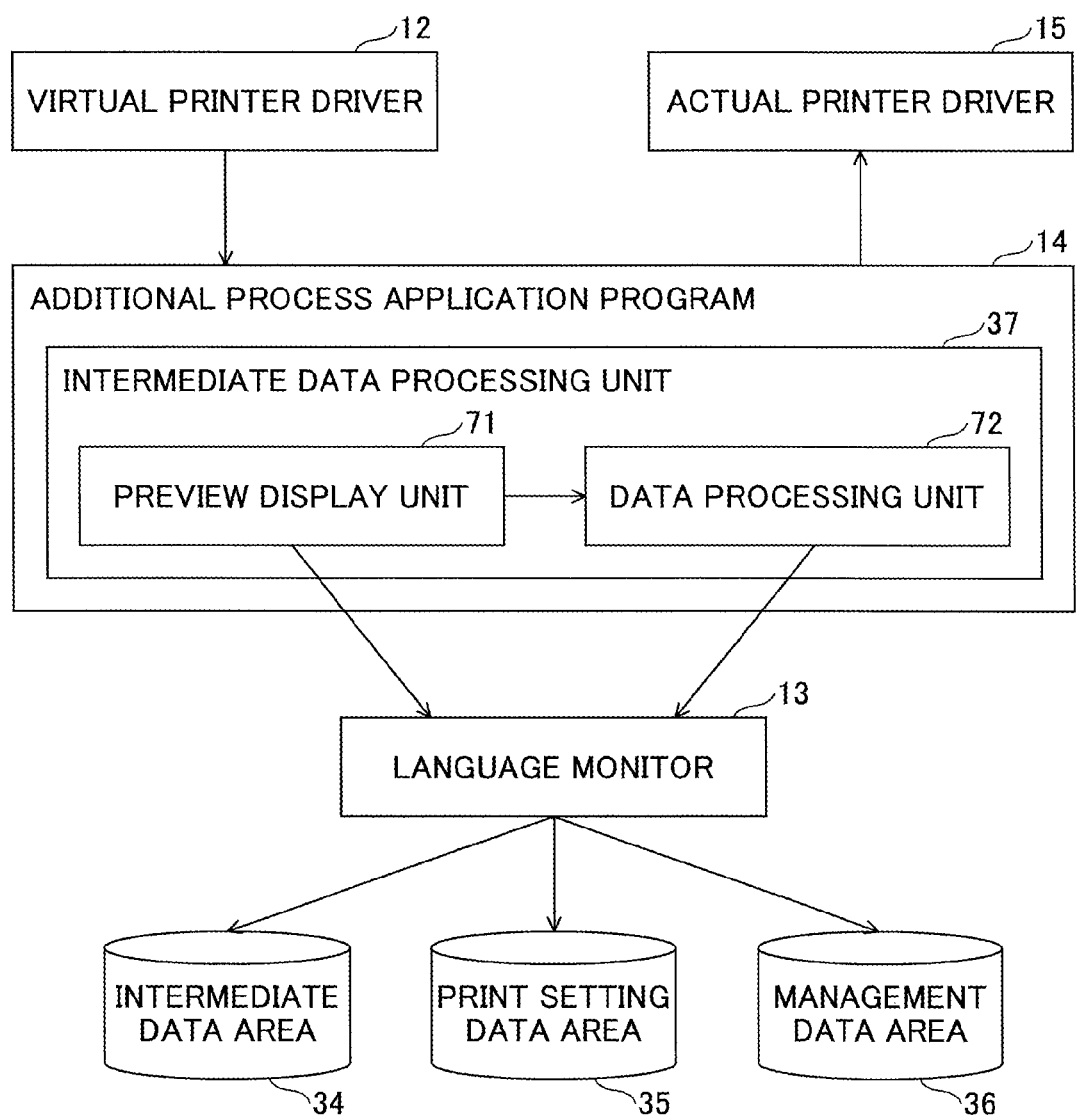
FIG. 5 is a view for explaining an additional process application program of the embodiment.

Next, the above described additional process application program 14 is explained in detail. FIG. 5 is a view for explaining the additional process application program 14 of the embodiment. Here, for the example illustrated in FIG. 5, the intermediate data processing unit 37 of the additional process application program 14 displays a preview or performs data processing as the additional function on the intermediate data, for example.

The intermediate data processing unit 37 includes a preview display unit 71 and a data processing unit 72. Upon receiving the print completion notification from the virtual printer driver 12, the preview display unit 71 obtains the respective intermediate data and the respective print setting data from the first storage 16 via the language monitor 13, and displays a preview image.

When the user inputs an operation of processing, editing or the like on the displayed preview image via the GUI, for example, the data processing unit 72 obtains the intermediate data, the print setting data and the management ID from the first storage 16 via the language monitor 13 and performs processing, editing or the like on the data.

As described above, when the data processing unit 72 completes processing, editing or the like on the data, the additional process application program 14 sends the intermediate data with the management ID to the actual printer driver 15.

(Flow of Process of Language Monitor 13)

Figure 6:
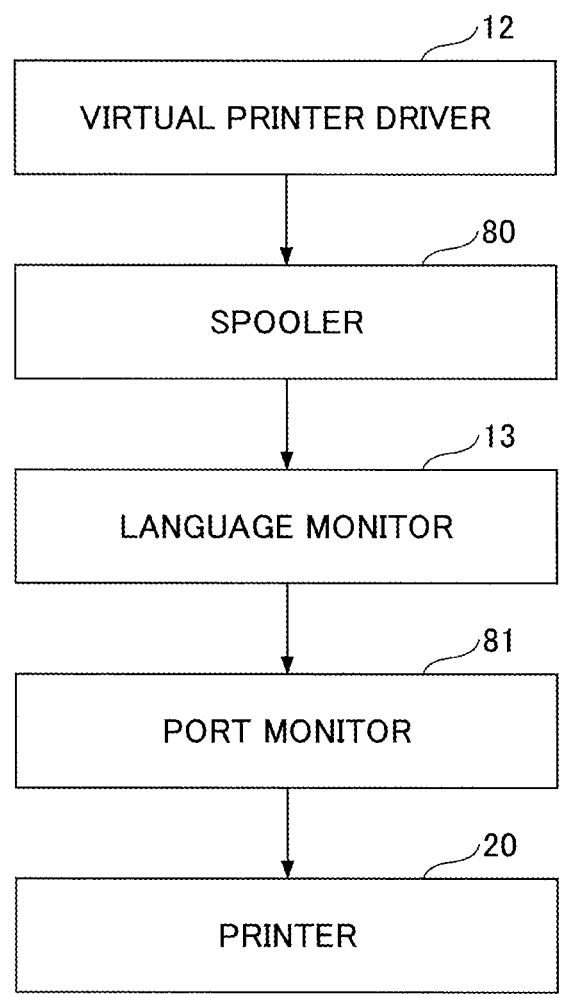
FIG. 6 is a view illustrating an example of a flow of processes including a process by a language monitor.

An example of a flow of the process of the language monitor 13 is explained. FIG. 6 is a view illustrating an example of a flow of processes including the process by the language monitor 13. In FIG. 6, an example of the processes is explained using the virtual printer driver 12, a spooler 80, the language monitor 13, a port monitor 81 and the printer 20.

The spooler 80 illustrated in FIG. 6 is one of the OS functions and obtains data output by the virtual printer driver 12, for example. As described above, the language monitor 13 is one of the modules of the Windows architecture. The language monitor 13 is called by the spooler 80 when the virtual printer driver 12 prints (outputs) the intermediate data and performs the process.

Upon receiving the data from the spooler 80, the language monitor 13 stores the data in a predetermined area in accordance with a previously determined key, for example. In a general print process, the port monitor 81 obtains the data stored by the language monitor 13, and sends the data to the printer 20 via a port driver. Then, the printer 20 prints the data.

The language monitor 13 includes an interface set in the Windows architecture, for example. Thus, a vender may develop the language monitor 13. Alternatively, the language monitor 13 may be a Windows standard language monitor.

(Usage of Language Monitor 13)

Figure 7A:
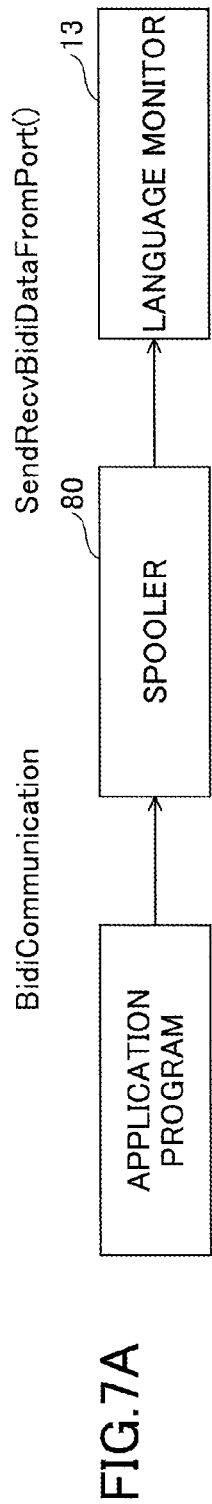
FIG. 7A and FIG. 7B are views illustrating an example of using the language monitor.
Figure 7B:
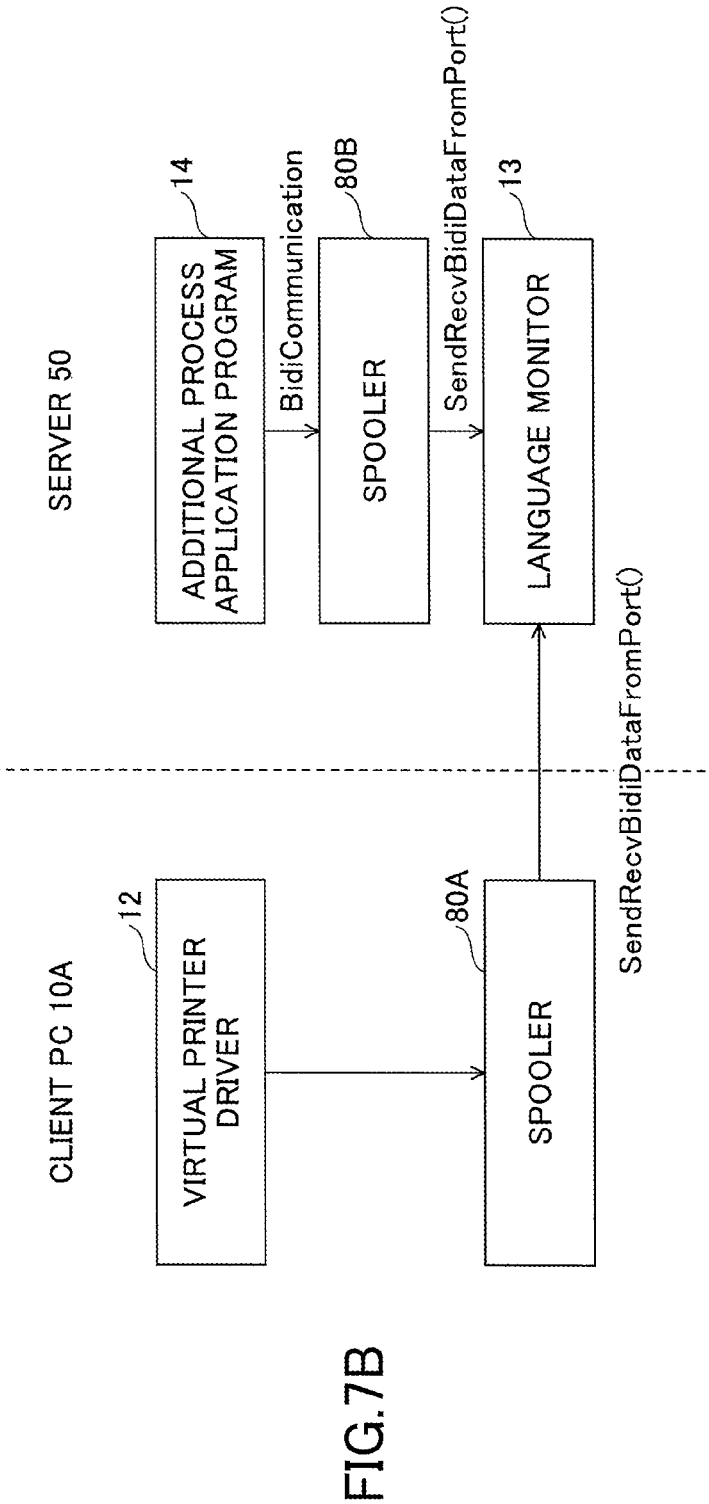

FIG. 7A and FIG. 7B are views illustrating an example of using the language monitor 13. FIG. 7A is a view illustrating an example in which the application program uses the language monitor 13. FIG. 7B is a view illustrating an example in which the language monitor 13 is used in a point and print environment.

For the example illustrated in FIG. 7A, the language monitor 13 includes an interface (SendRecvDataFromPort( ), for example) accessible from an external application program. The application program illustrated in FIG. 7A calls the interface (SendRecvDataFromPort( ), for example) of the language monitor 13 using an interface (Bidi Communication, for example) provided by the spooler 80, which is one of the OS functions.

The spooler 80 calls the interface (SendRecvDataFromPort( ), for example) of the language monitor 13, by selecting a printer name in the interface (Bidi Communication, for example), associated with a driver of the printer.

At this time, a specific key is passed to the language monitor 13 from the application program. Then, the language monitor 13 reads and writes data using the specific key. This means that the language monitor 13 is capable of returning data to the application program that called the language monitor 13 by storing respective data and reading the data corresponding to the specific key upon receiving the specific key.

In this embodiment, as an example of the specific key, a unique ID that is set for each print job that uniquely identifies the intermediate data and time of printing may be used.

For the example illustrated in FIG. 7B, the virtual printer driver 12 of the client PC 10a calls the interface (SendRecvDataFromPort( ), for example) of the language monitor 13 by a spooler 80A.

The additional process application program 14 of the server 50 calls the interface (SendRecvDataFromPort( ), for example) of the language monitor 13 via the interface (Bidi Communication, for example) of a spooler 80B. As such, the client PC 10a or the server 50 is capable of accessing the language monitor 13 by a Remote Procedure Call (RPC) or the like of the OS of Windows, for example.

(Sending and Receiving Event Notification)

FIG. 8 is a view illustrating sending and receiving the event notification of the embodiment. FIG. 8 illustrates operations of sending and receiving the event notification by the event sending unit 33 and the event receiving unit 38.

As illustrated in FIG. 8, a mailslot 82 is used in sending and receiving the event notification. First, the event receiving unit 38 selects a specific mailslot name and generates the mailslot 82 (CreateMailslot( )). Then, the event sending unit 33 writes the event notification in the mailslot 82 using the mailslot name selected by the event receiving unit 38.

The event receiving unit 38 monitors whether data is written in the mailslot 82, and reads the mailslot 82 when the data is written in the mailslot 82. With this operation, the event notification is sent to the event receiving unit 38 from the event sending unit 33. The Mailslot name may be changed by a registry or an external setting.

(Sequence of Basic Structure)

Figure 9:
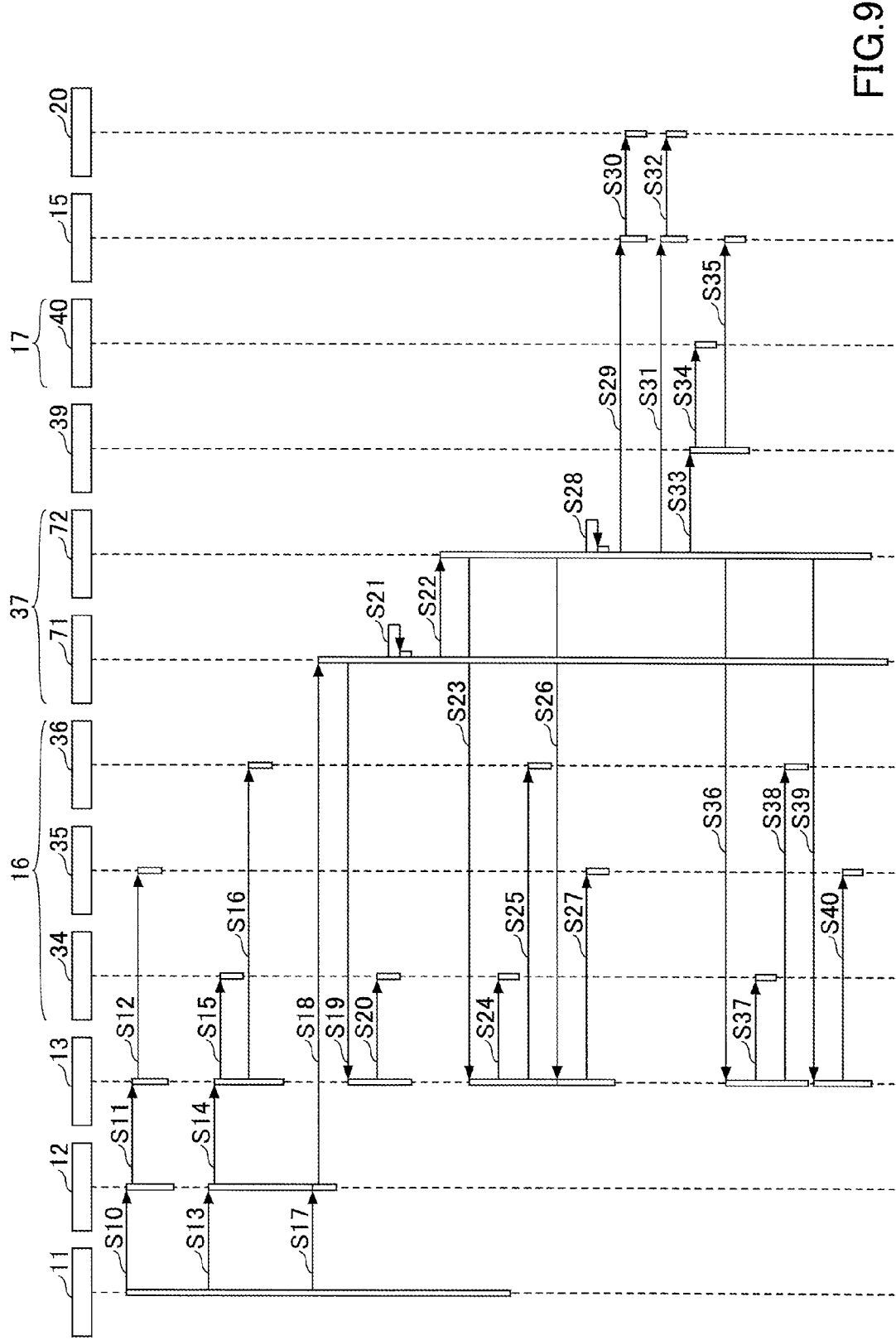
FIG. 9 is a sequence diagram of an example of a basic structure of the embodiment.

FIG. 9 is a sequence diagram of an example of a basic structure of the embodiment. For the example illustrated in FIG. 9, processes are performed by the print application program 11, the virtual printer driver 12, the language monitor 13, the intermediate data processing unit 37 (the preview display unit 71 and the data processing unit 72) and the job history storage control unit 39 of the additional process application program 14 and the actual printer driver 15 of the client PC 10, and the printer 20.

Further, for the example illustrated in FIG. 9, the intermediate data area 34, the print setting data area 35 and the management data area 36 of the first storage 16, and the job history area 40 of the second storage 17, of the client PC 10 are also illustrated for explanation purposes.

As illustrated in FIG. 9, when the print application program 11 performs a print start process in the client PC 10 (S10), the virtual printer driver 12 outputs print setting data to the language monitor 13 (S11). The language monitor 13 stores the print setting data obtained from the virtual printer driver 12 in the print setting data area 35 of the first storage 16 (S12).

When the print application program 11 performs a print process (S13), the virtual printer driver 12 outputs intermediate data to the language monitor 13 (S14). Then, the language monitor 13 stores the intermediate data (S15) and management ID (S16) in the intermediate data area 34 and the management data area 36, of the first storage 16, respectively. At this time, the print setting data stored in the print setting data area 35, the intermediate data stored in the intermediate data area 34 and the management ID stored in the management data area 36 are stored in the first storage 16 in correspondence with each other.

Next, when the print application program 11 performs a print completion process (S17) and the virtual printer driver 12 sends the print completion notification (S18), the preview display unit 71 instructs the language monitor 13 to read out the intermediate data (S19).

When the language monitor 13 reads out the intermediate data from the intermediate data area 34 (S20), the preview display unit 71 displays a preview image based on the intermediate data obtained via the language monitor 13 (S21). The preview display unit 71 may display the preview image via the display device such as the LCD 65 or the like, for example.

After completing displaying the preview image in step S21, the preview display unit 71 sends notification of the print start process to the data processing unit 72 (S22). Then, the data processing unit 72 instructs the language monitor 13 to read out the intermediate data (S23). Then, the language monitor 13 reads out the intermediate data (S24) and the management ID (S25) from the intermediate data area 34 and the management data area 36, respectively.

Further, the data processing unit 72 also instructs the language monitor 13 to read out the print setting data (S26). Then, the language monitor 13 reads out the print setting data from the print setting data area 35 (S27).

The data processing unit 72 performs data processing based on the intermediate data, the print setting data and the management ID obtained via the language monitor 13 (S28). Here, the data processing unit 72 may edit the intermediate data and the print setting data or may add the management ID to the print setting data in accordance with a previously set additional function.

When the data processing unit 72 performs a print start process with the actual printer driver 15 (S29), the actual printer driver 15 starts a job generation process for having print data output from the printer 20 (S30).

When the data processing unit 72 performs a print process using the actual printer driver 15 (S31), the actual printer driver 15 generates the print data to be output to the printer 20 based on the intermediate data and the print setting data and sends the generated print data to the printer 20 (S32).

When the data processing unit 72 performs a print completion process using the actual printer driver 15 (S33), the job history storage control unit 39 stores a job name and the management ID of the intermediate data in the job history area 40 of the second storage 17 (S34). With this, the process of using the actual printer driver 15 is completed (S35).

Next, the data processing unit 72 instructs the language monitor 13 to delete the intermediate data stored in the intermediate data area 34 (S36), Then, the language monitor 13 deletes the intermediate data (S37) and the management ID (S38) stored in the intermediate data area 34 and the management data area 36, respectively. Further, the data processing unit 72 instructs the language monitor 13 to delete the print setting data (S39). Then, the language monitor 13 deletes the print setting data stored in the print setting data area 35 (S40).

According to the above described steps, the intermediate data, the management ID and the print setting data for which the corresponding print data is output to the printer 20 are deleted from the first storage 16 of the client PC 10.

(Sequence of Data Processing System 100)

Figure 10:
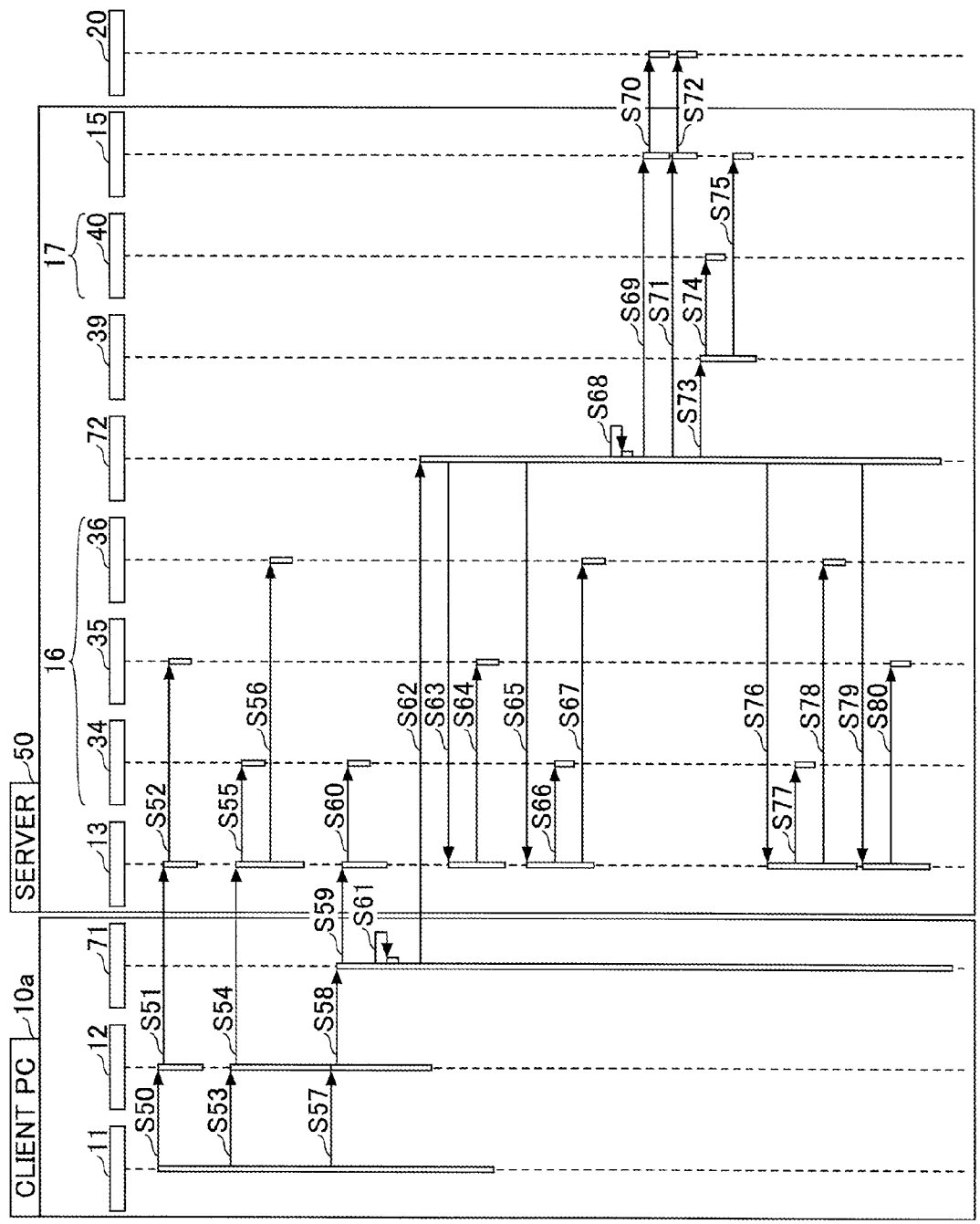
FIG. 10 is a sequence diagram of the data processing system of the embodiment.

FIG. 10 is a sequence diagram of the data processing system of the embodiment. For the example illustrated in FIG. 10, processes are performed by the print application program 11, the virtual printer driver 12 and the preview display unit 71 of the intermediate data processing unit 37 of the additional process application program 14 of the client PC 10a, the language monitor 13, the data processing unit 72 of the intermediate data processing unit 37 of the additional process application program 14, the job history storage control unit 39 and the actual printer driver 15 of the server 50 and the printer 20.

Further, for the example illustrated in FIG. 10, the intermediate data area 34, the print setting data area 35 and the management data area 36 of the first storage 16, and the job history area 40 of the second storage 17, of the server 50 are also illustrated for explanation purposes. Further, for the example illustrated in FIG. 10, the processes are performed by the SSR of an EMF spool format.

As illustrated in FIG. 10, when the print application program 11 of the client PC 10a performs the print start process (S50), the virtual printer driver 12 outputs the print setting data to the language monitor 13 of the server 50 (S51). The language monitor 13 stores the print setting data obtained from the virtual printer driver 12 in the print setting data area 35 of the first storage 16 (S52).

When the print application program 11 of the client PC 10a performs the print process (S53), the virtual printer driver 12 outputs the intermediate data to the language monitor 13 of the server 50 (S54). Then, the language monitor 13 stores the intermediate data (S55) and the management ID (S56) in the intermediate data area 34 and the management data area 36, respectively. At this time, the print setting data stored in the print setting data area 35, the intermediate data stored in the intermediate data area 34 and the management ID stored in the management data area 36 are stored in the first storage 16 in correspondence with each other.

As such, the print setting data, the intermediate data and the management ID obtained via the language monitor 13 of the server 50 from the virtual printer driver 12 of the client PC 10a, are respectively stored in predetermined storage areas of the server 50.

Next, when the print application program 11 of the client PC 10a performs the print completion process (S57) and the virtual printer driver 12 sends the print completion notification (S58), the preview display unit 71 instructs the language monitor 13 of the server 50 to read out the intermediate data (S59).

When the language monitor 13 of the server 50 reads out the intermediate data from the intermediate data area 34 (S60), the preview display unit 71 of the client PC 10 displays a preview image based on the intermediate data obtained via the language monitor 13 of the server 50 (S61).

After completing displaying the preview in step S61, the preview display unit 71 sends notification of the print start process to the data processing unit 72 of the server 50 (S62). Then, when the data processing unit 72 of the server 50 instructs the language monitor 13 to read out the print setting data (S63), the language monitor 13 reads out the print setting data from the print setting data area (S64).

Further, the data processing unit 72 of the server 50 also instructs the language monitor 13 to read out the intermediate data (S65). Then, the language monitor 13 reads out the print data (S66) and the management ID (S67) from the intermediate data area 34 and the management data area 36, respectively.

Further, the data processing unit 72 performs data processing based on the intermediate data, the print setting data and the management ID obtained via the language monitor 13 (S68).

When the data processing unit 72 performs the print start process using the actual printer driver (S69), the actual printer driver 15 starts the job generation process for having print data output from the printer 20 (S70).

When the data processing unit 72 performs the print process using the actual printer driver 15 (S71), the actual printer driver 15 generates the print data to be output to the printer 20 based on the intermediate data and the print setting data and sends the generated print data to the printer 20 (S72).

When the data processing unit 72 performs the print completion process using the actual printer driver 15 (S73), the job history storage control unit 39 stores the job name and the management ID of the intermediate data in the job history area 40 of the second storage 17 (S74). With this, the process of using the actual printer driver 15 is completed (S75).

Next, the data processing unit 72 instructs the language monitor 13 to delete the intermediate data stored in the intermediate data area (S76). As steps S77 to S80 illustrated in FIG. 10 by the language monitor 13 are the same as the steps S37 to S40 illustrated in FIG. 9 of the language monitor 13, explanations are not repeated.

As described above, the additional process application program 14 can easily obtain the intermediate data from the storage that stores the intermediate data regardless of whether the storage is in the client PC 10a or in the server 50 by using the language monitor 13, for example.

(Sequence when Tracking Job)

Figure 11:
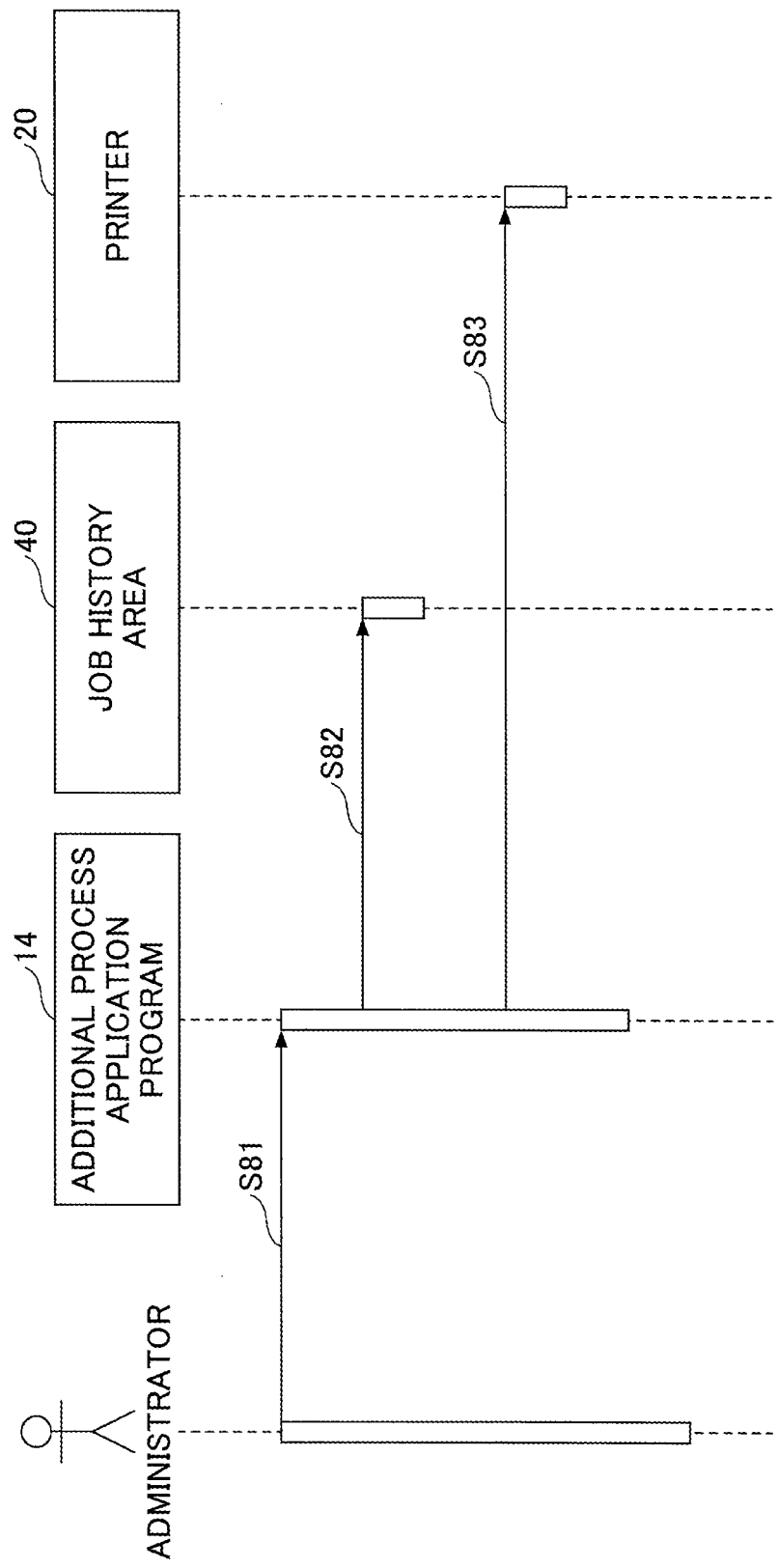
FIG. 11 is a sequence diagram when tracking a job of the embodiment.

FIG. 11 is a sequence diagram when tracking the job of the embodiment. For the example illustrated in FIG. 11, the processes are performed by the additional process application program 14 and the printer 20.

As illustrated in FIG. 11, when an administrator, for example, selects a job (job name) to be tracked using the additional process application program 14, and requests tracking the job (the request for obtaining the processed result in response to the print request) (S81), the additional process application program 14 refers to the job history area 40 and obtains the management ID of the intermediate data that is in correspondence with the job name of the job (S82).

Next, the additional process application program 14 queries, based on the obtained management ID, the printer 20 whether the job corresponding to the management ID was successfully printed or not, and obtains information indicating whether the job was successfully printed or not from the printer 20 (S83).

As described above, the additional process application program 14 is capable of reporting the tracked result of the job of the intermediate data to the administrator or the like by obtaining the information indicating whether the job was successfully printed or not from the printer 20 using the management ID of the intermediate data.

Here, as the additional process application programs 14 of the client PC 10a and the server 50 are synchronized by the point and print function, it is possible to obtain the management ID of the intermediate data stored in the job history area 40 from the additional process application program 14 of the client PC 10a and track the job.

(Drawing Unit 31 of Virtual Printer Driver 12)

An operation of generating XPS data by the drawing unit 31 of the virtual printer driver 12 is explained. When the virtual printer driver 12 is an XPS driver, the drawing unit 31 is operated by a process of "Print Filter Pipeline Service". Filters included in the process of the "Print Filter Pipeline Service" can be developed by a vender, in other words, a provider that provides the printer 20.

In this embodiment, these filters function as the intermediate data generating unit 32 of the drawing unit 31. "Filter Pipeline Manager" and "Inter-filter Communication" call the filters in cooperation with each other, and XPS data on which processes are performed is sent to a spooler after the entire processes by the filters are finished. Drawing information necessary between the filters can be set and obtained using "Print Pipeline Property Bag".

Filters for the XPS data include "XtoXFilter", "StoSFilter" or the like. "XtoXFilter" is capable of handling each part of an XPS file. Each part means each information item configuring the XPS data, for example. "StoSFilter" is capable of handling the XPS data as a stream.

In this embodiment, it is possible to output the print data (intermediate data) and the print setting data by embodying filters for outputting the print data and the print setting data, respectively.

(Structure of XPS Data)

A structure of the XPS data (document) generated by the virtual printer driver 12 is explained. The XPS data is in a file format described in an Extensible Markup Language (XML) format. The XPS data includes document data including "Fixed Document Sequence", "Fixed Document", "Fixed Page", "Image" and "Font" and PrintTickets associated with the document data. Thus, the above described "XtoXFilter" is capable of accessing each part, for example.

(Output Embodiment of Intermediate Data)

Figure 12A:
FIG. 12A and FIG. 12B are views illustrating output embodiments of the intermediate data of the embodiment.
Figure 12B:
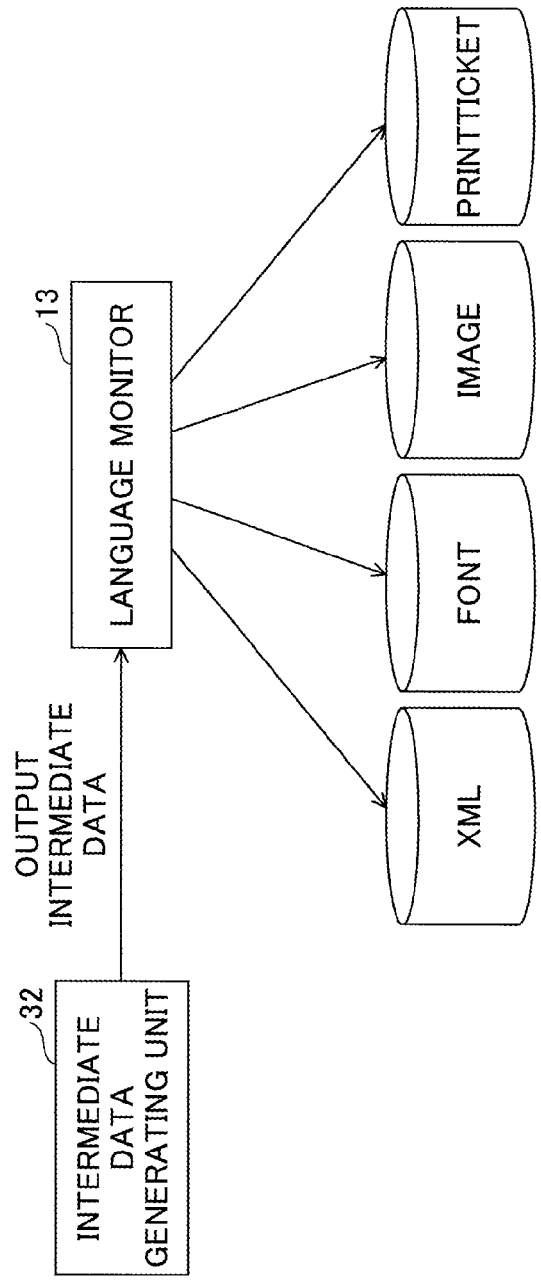

FIG. 12A and FIG. 12B are views illustrating output embodiments of the intermediate data of the embodiment. FIG. 12A illustrates an example in which an XPS file itself is output as the intermediate data, and FIG. 12B illustrates an example in which the file is divided into pages and output as the intermediate data.

For the example illustrated in FIG. 12A, the intermediate data generating unit 32 outputs the XPS data via the language monitor 13 by the drawing unit 31 that is structured by the "StoSFilter" format filter, for example. For example, by the "StoSFilter", the XPS file is processed as a stream so that the data is output as a single XPS data unit. As the XPS data includes the PrintTicket, it is unnecessary to additionally output a PrintTicket.

For the example illustrated in FIG. 12B, the intermediate data generating unit 32 outputs XML data corresponding to each page included in the XPS data format filter, related fonts and image data via the language monitor 13 by the drawing unit 31 structured by the "XtoXFilter".

With this configuration, the additional process application program 14 can access the intermediate data before the entirety of the XPS data is output. For the example illustrated in FIG. 12B, a PrintTicket is further output. With this, the additional process application program 14 can refer to the print setting data.

In this embodiment, the management ID may be embedded at a head portion of the intermediate data generated by the virtual printer driver 12, or may be embedded in the print setting data described as the PrintTicket.

Further, when sending the intermediate data from the additional process application program 14 to the actual printer driver 15, the management ID may be embedded in the PrintTicket, the management ID may be sent using the Windows Print API or the like. Further, when sending the print data from the actual printer driver 15 to the printer 20, the management ID may be sent using a command such as PJL or the like, for example.

According to the above described embodiment, by commonly sharing the management ID of the intermediate data by the components, the intermediate data in the generic data format can be tracked.

Further, with the above structure, by using the intermediate data in the generic data format, an additional function can be actualized by the additional process application program so that a print solution capable of printing in various PDL formats, not in just a specific PDL format, can be provided. Further, by using the language monitor, the additional process application program can easily process the intermediate data even in the point and print environment.

According to the embodiment, it is possible to track the intermediate data formed in a predetermined data format.

The individual constituents of the client PC 10 and the data processing system 100 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Although a preferred embodiment of the data processing system and the method of data processing has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The present application is based on and claims the benefit of priority of Japanese Priority Applications No. 2013-111181 filed on May 27, 2013, and No. 2014-093868 filed on Apr. 30, 2014 the entire contents of which are hereby incorporated by reference.

What is claimed is:

1. A data processing system comprising:
   a first apparatus including a first processor, the first processor being a central processing unit (CPU);
   a second apparatus including a second processor, the second processor being a CPU, the second apparatus being separate from the first apparatus;
   an image processing apparatus;
   a print request accepting unit that accepts a request for printing;
   an intermediate data generating unit that generates intermediate data and identification data based on the request for printing accepted by the print request accepting unit, the identification data being data that identifies the intermediate data;
   a first storage control unit that stores the intermediate data generated by the intermediate data generating unit and identification data in correspondence with each other in a first storage area;
   a notification unit that sends a notification indicating that the intermediate data has been generated by the intermediate data generating unit;
   a processing unit that performs a process regarding the intermediate data stored in the first storage area upon receiving the notification from the notification unit;
   a second storage control unit that stores the identification data that is stored in the first storage area in correspondence with the intermediate data processed by the processing unit in a second storage area, which is different from the first storage area;
   a conversion unit that converts the intermediate data processed by the processing unit to print data that is processable by the image processing apparatus;
   a process requesting unit that sends a request for processing the print data converted by the conversion unit to the image processing apparatus, the image processing apparatus being configured to, in response to the request for processing, print the print data when a print error does not exist;
   a result request accepting unit that accepts a request for obtaining a processed result of the request for printing, the processed result being an indication of whether or not the print data was successfully printed; and
   an obtaining unit that obtains the processed result from the image processing apparatus based on the identification data stored in the second storage area when the result request accepting unit accepts the request for obtaining the processed result,
   wherein the first processor is configured to obtain the processed result obtained by the obtaining unit,
   wherein functions of the print request accepting unit and the result request accepting unit are performed by the first processor, functions of the intermediate data generating unit, the first storage control unit and the notification unit are performed by the first processor or the second processor, and functions of the process requesting unit, the processing unit, the second storage control unit, the conversion unit and the obtaining unit are performed by the second processor,
   wherein the processing unit obtains the intermediate data stored in the first storage area via the first storage control unit, and
   wherein the process requesting unit sends the print data with the identification data to the image processing apparatus so that the image processing apparatus is capable of storing a processed result of the print data in correspondence with the identification data.

2. The data processing system according to claim 1, wherein the intermediate data generating unit adds the identification data to setting data included in the intermediate data.

3. The data processing system according to claim 1, wherein the second storage control unit stores the identification data as job history of the intermediate data.

4. The data processing system according to claim 3, wherein the process requesting unit sends the print data with the identification data to the image processing apparatus so that the image processing apparatus is capable of storing a processed result of the print data in correspondence with the identification data, and
   wherein the obtaining unit obtains the processed result indicating whether the print data is successfully processed from the image processing apparatus based on the identification data previously sent to the image processing apparatus by the process requesting unit and the identification data stored in the second storage area as the job history of the intermediate data.

5. The data processing system according to claim 1, wherein the processing unit obtains the intermediate data via the first storage control unit at timing when receiving the notification from the notification unit.

6. The data processing system according to claim 1, wherein the process requesting unit obtains the identification data of the intermediate data via a predetermined interface with the processing unit, and sends the identification data to the image processing apparatus using a predetermined job language when sending the print data to the image processing apparatus.

7. A method of operating a data processing system, the data processing system including a first apparatus and a second apparatus separate from the first apparatus, the first apparatus including a first processor, the second apparatus including a second processor, the method comprising:
   accepting a request for printing;
   generating intermediate data and identification data based on the request for printing accepted in the accepting, the identification data being data that identifies the intermediate data;
   storing the intermediate data and identification data generated in the generating in correspondence with each other in a first storage area;
   sending a notification indicating that the intermediate data has been generated;
   performing a process regarding the intermediate data stored in the first storage area upon receiving the notification;
   storing the identification data that is stored in the first storage area in correspondence with the intermediate data processed in the processing in a second storage area, which is different from the first storage area;
   converting the intermediate data processed in the processing to print data that is processable by an image processing apparatus;
   sending a request for processing the print data converted in the converting to the image processing apparatus;
   in response to the request for processing, printing the print data at the image processing apparatus when a print error does not exist;

accepting a request for obtaining a processed result of the request for printing, the processed result being an indication of whether or not the print data was successfully printed;

obtaining, using the second processor, the processed result from the image processing apparatus based on the identification data stored in the second storage area when the request for obtaining the processed result is accepted; and obtaining, at the first processor, the processed result that was obtained using the second processor, wherein the accepting the request for printing and the accepting the request for obtaining the processed result are performed by the first processor, the storing the intermediate data, the generating the intermediate data and the sending the notification are performed by the first processor or the second processor, and the performing the process, the storing the identification data, the converting the intermediate data, the requesting processing of the print data are performed by the second processor, wherein the print data is sent with the identification data to the image processing apparatus so that the image processing apparatus is capable of storing a processed result of the print data in correspondence with the identification data.

8. A data processing system comprising:

a first apparatus including a first processor, the first processor being a central processing unit (CPU);

a second apparatus including a second processor, the second processor being a CPU, the second apparatus being separate from the first apparatus;

an image processing apparatus;

a print request accepting unit that accepts a request for printing;

an intermediate data generating unit that generates intermediate data and identification data based on the request for printing accepted by the print request accepting unit, the identification data being data that identifies the intermediate data;

a first storage control unit that stores the intermediate data generated by the intermediate data generating unit and identification data in correspondence with each other in a first storage area;

a notification unit that sends a notification indicating that the intermediate data has been generated by the intermediate data generating unit;

a processing unit that performs a process regarding the intermediate data stored in the first storage area upon receiving the notification from the notification unit;

a second storage control unit that stores the identification data that is stored in the first storage area in correspondence with the intermediate data processed by the processing unit in a second storage area, which is different from the first storage area; a conversion unit that converts the intermediate data processed by the processing unit to print data that is processable by the image processing apparatus;

a process requesting unit that sends a request for processing the print data converted by the conversion unit to the image processing apparatus, the image processing apparatus being configured to, in response to the request for processing, print the print data when a print error does not exist; a result request accepting unit that accepts a request for obtaining a processed result of the request for printing, the processed result being an indication of whether or not the print data was successfully printed; and an obtaining unit that obtains the processed result from the image processing apparatus based on the identification data stored in the second storage area when the result request accepting unit accepts the request for obtaining the processed result, wherein the first processor is configured to obtain the processed result obtained by the obtaining unit, wherein functions of the print request accepting unit and the result request accepting unit are performed by the first processor, functions of the intermediate data generating unit, the first storage control unit and the notification unit are performed by the first processor or the second processor, and functions of the process requesting unit, the processing unit, the second storage control unit, the conversion unit and the obtaining unit are performed by the second processor, wherein the processing unit obtains the intermediate data stored in the first storage area via the first storage control unit, and wherein the process requesting unit obtains the identification data of the intermediate data via a predetermined interface with the processing unit, and sends the identification data to the image processing apparatus using a predetermined job language when sending the print data to the image processing apparatus.

* * * * *